United States Patent [19]

Martin et al.

[11] Patent Number: 5,056,704

[45] Date of Patent: Oct. 15, 1991

[54] TUBE FITTING HAVING A SADDLE BEAD WITH CONFORMING PILOT

[75] Inventors: Robert E. Martin, Dallas; Richard B. Martin, Carrollton, both of Tex.

[73] Assignee: Tube Forming, Inc., Carrollton, Tex.

[21] Appl. No.: 158,797

[22] Filed: Feb. 22, 1988

[51] Int. Cl.$^5$ .............................................. B23K 31/02
[52] U.S. Cl. .................................. 228/173.4; 228/183; 285/286; 285/287
[58] Field of Search ...................... 228/173.4, 183, 184, 228/153, 171; 285/222, 286, 287, 416; 29/157 T, 157.3 C

[56] References Cited

U.S. PATENT DOCUMENTS

| 3,971,500 | 7/1976 | Kushner et al. | 29/157 T |
| 3,998,376 | 12/1976 | Haines | 29/157 T |

FOREIGN PATENT DOCUMENTS

| 756047 | 12/1933 | France | 285/222 |
| 527182 | 10/1957 | Italy | 285/222 |
| 163593 | 9/1983 | Japan | 228/173.4 |
| 212472 | 9/1986 | Japan | 228/173.4 |

*Primary Examiner*—Samuel M. Heinrich
*Attorney, Agent, or Firm*—Dennis T. Griggs

[57] ABSTRACT

A method and product for forming a joint between intersecting sections of tubing for the conduct of fluid flow. For forming the joints, there is included a section of primary tubing which is drilled or punched to form a radial aperture defining the location at which the joint is to be formed. To effect joinder with the primary tube, there is provided a secondary tube having an end that includes a pilot portion extending rearward from a recessed end plane and which merges with an integrally shaped saddle bead formed about the tube periphery. Inserting the pilot end of the secondary tube into the provided aperture of the primary tube enables the saddle bead to incur a contour overlay against the outside diameter of the primary tube for effecting lateral alignment therebetween while enabling joinder by welding, brazing or soldering. Also disclosed is the method of forming the secondary tube to produce a recessed end face/saddle bead combination by the use of upsetting swaging dies.

1 Claim, 3 Drawing Sheets

TUBE FITTING HAVING A SADDLE BEAD WITH CONFORMING PILOT

FIELD OF THE INVENTION

This invention relates to the art of tubular joints of the type formed by brazing, soldering or welding intersecting sections of tubing.

BACKGROUND OF THE INVENTION

The formation of joint connections between intersecting pipes or tubing without the use of couplings or other prefabricated fittings is a common industrial practice. Whether prepared on site or prefabricated, the usual procedure is to first form a radial aperture by punching or drilling through the wall of the recipient primary tube section. The secondary tubing is then laterally positioned in the aperture where the two are secured together by metal bonding applied about the opening.

To aid in controlling penetration of the secondary tubing within the bore of the primary tubing while providing a structurally convenient bonding surface, it has been common to form or apply an enlarged annular bead inwardly displaced from the insertable end of the secondary tube. The outboard end per se functions as a pilot to aid in placement of the tube within the drilled aperture.

While such joints formed in the foregoing manner have functioned with a reasonable degree of satisfaction in the end joint of which they become a part, certain limitations have been experienced. For example, it is sometimes difficult to obtain objective perpendicular alignment between the intersecting axes of the respective tube sections. Such misalignments may cause difficulties of assembly with remaining piping of the system yet to be added and can require considerable compensation elsewhere for rendering the system operable and fluid tight. Yet another difficulty has been flow obstruction attributed to pilot end penetration within the bore of the primary tube causing undesirable turbulence to occur. Any obstruction represents an energy loss and is of course a condition which should be avoided.

OBJECTS OF THE INVENTION

It is therefore an important object of the invention to provide an improved method of shaping the insertable pilot end of secondary tubing to be utilized in a metal bonded pipe joint between intersecting tube sections.

Another object of the invention to effect a bonded joint between intersecting tubing with arcuate alignment of the respective tubing sections while minimizing flow obstructions in the vicinity of the joint.

SUMMARY OF THE INVENTION

This invention relates to forming of a joint between intersecting sections of tubing. More specifically, the invention relates to a novel joint formation and the method of effecting the shaped end of a secondary tube providing an enhanced structure for forming such joints. By virtue thereof, there is effected greater alignment accuracy between the primary and secondary tubes in the finished joint. At the same time, the pilot end face of the secondary tube while having a controlled and limited axial dimension is selectively shaped for minimizing obstruction in the primary tube in and about the joint area.

The foregoing are achieved by the method and products of the invention which include an annular saddle shaped bead formed juxtaposed to the pilot end of the secondary tubing. The bead is formed by a swaged upset that simultaneously shapes the end face of the pilot end to an arcuate conforming configuration. When placed in the primary tube, the saddle and pilot end shape are coordinated so that the pilot end will have minimum penetration and be substantially concentric while conforming with the internal wall surface of the primary tube. In this manner, the saddle bead serves on initial assembly prior to the joinder of the respective tube sections to effect the perpendicular alignment sought to be achieved. After assembly, the bead provides additional surface area for bonding. The arcuate pilot end face eliminates a segment of the tube end that would otherwise cause detrimental obstruction to fluid flow in the area of the joint.

The above noted features and advantages of the invention, as well as other superior aspects thereof, will be further appreciated by those skilled in the art upon reading the detailed description which follows in conjunction with the drawings.

DESCRIPTION OF THE PREFERRED EMBODIMENT

Figure 1:
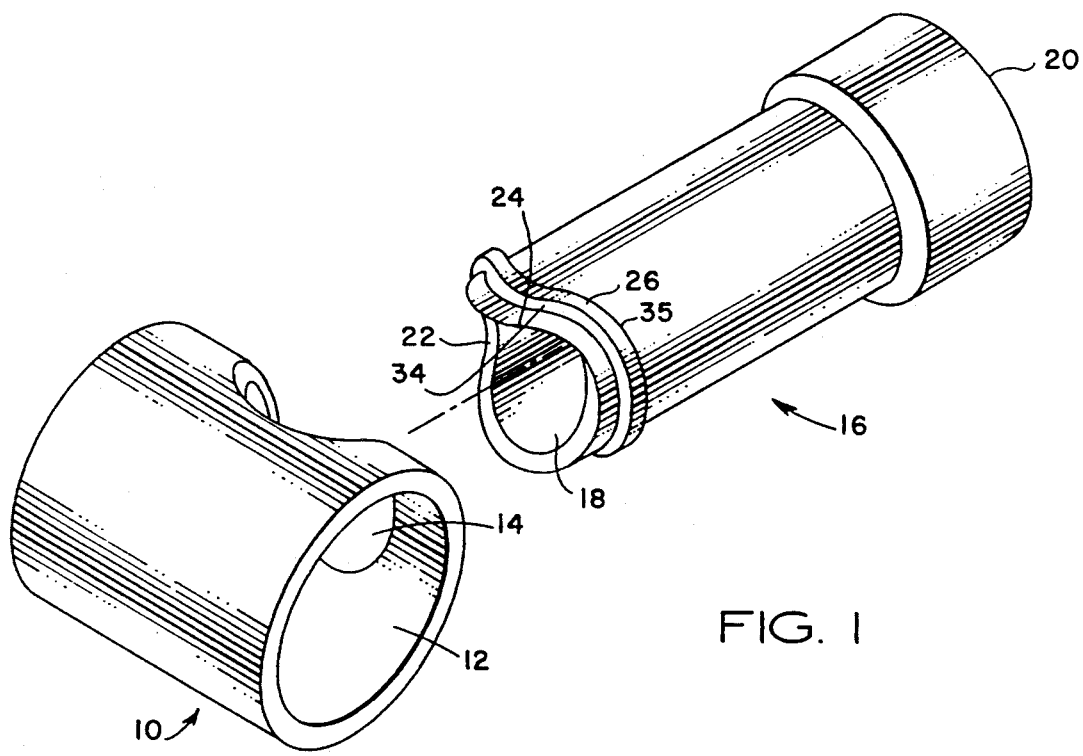
FIG. 1 is an isometric exploded view of a tube joint to be formed in accordance herewith.

In the description which follows, like parts are marked throughout the specification and drawings with the same reference numerals, respectively. Drawing figures are not necessarily to scale and in certain views, parts may be drawn rotated into the plane of the drawing for purposes of clarity.

Referring now to the drawings, there is illustrated in FIG. 1 a section of primary conduit 10 defining an internal flow passage 12 and containing a radial aperture 14. The aperture has been drilled or punched through the side wall of tube 10 for defining the location of a joint to be formed with secondary tubing conduit 16. The latter tubing defines a flow passage 18 and at its distal end 20 includes an enlarged cup for receiving additional lengths of tubing in a sweat fitting as is well known. The near end 22 of tubing 18 comprises a short length of tubing 24 to function as a pilot that merges with a saddle shaped annular bead 26 as will be understood. For purposes hereof, both tube conduits 10 and 16 are comprised of a swageable metal composition such as aluminum or copper.

Figure 2:
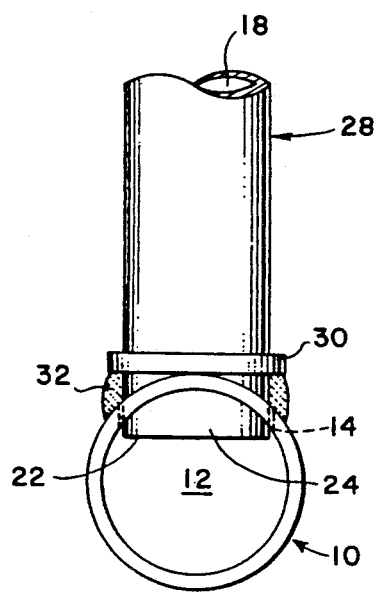
FIG. 2 is an end view of a bonded tube joint as formed in accordance with the prior art.

A similar purpose joint of prior art construction is illustrated in FIG. 2 comprising a primary tube 10 including the joint aperture 14. Inserted through aperture 14 is the pilot end 24 of a secondary tube 28 in accordance with the prior art. As there shown, the secondary tube 28 includes an externally applied straight flange bead 30 positioned removed from the transverse end face. When the pilot end is inserted in the assembly of FIG. 2, the bead 30 is bonded to the outside diameter of the primary conduit 10 as by fusion welding, soldering, brazing, etc. It can be readily appreciated that the bead 30 in this arrangement provides only a tangential engagement between the underface of the bead and the periphery of conduit 10 thereat. This leaves a natural tendency for the secondary tube unless otherwise secured to incur an angular offset from the intended perpendicular alignment of axes therebetween.

When thus assembled and unless securely held in a fixture or the like during the subsequent bonding step, the two intersecting conduits in the completely bonded joint can readily contain a degree of angular offset that may not be recognized until subsequent tube joinder is disposed thereon. It can also be appreciated from the prior art embodiment of FIG. 2 the extent to which the pilot end 24 penetrates within the flow passage 12 of the conduit 10 so as to constitute an undesireable obstruction to fluid flow thereabout.

Figure 3:
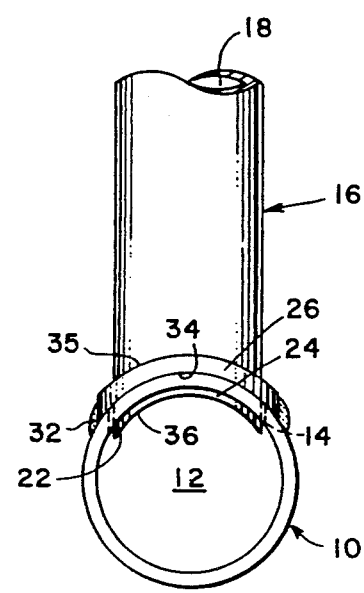
FIG. 3 is an end view of a bonded tube joint as formed by the invention hereof.

By contrast to the foregoing, there is illustrated in FIG. 3 the assembly of secondary conduit 16 in accordance herewith to the primary conduit 10 in which the radial aperture 14 has been pre-punched or drilled. By virtue of the saddle shaped bead 26, the underface 34 thereof is configured with a contour closely conforming with the periphery outside diameter of the conduit 10 surrounding the aperture 14. By conforming in this manner, perpendicular alignment between the intersecting tubings 10 and 16 becomes self-assured thereby avoiding the deviation or misalignment which has occurred in the joint formation manner of the prior art.

By virtue of the contour-to-contour overlay of the underface 34, a significantly greater surface area is provided to effect bond 32 and enhance the strength thereof by means of welding, brazing or soldering to complete joint formation. Moreover, in accordance herewith, the near end 22 of the tubing 16 rather than being transverse to the tube axis in the manner of FIG. 2 includes an arcuate recess 36 which as can be readily seen concentrically conforms with the annular surface represented by the internal diameter of conduit 10. According to this arrangement, the previous obstruction to flow imposed by the normal end of tubing in FIG. 2 is substantially diminished so as to minimize the adverse effects of turbulence while significantly reducing the pumping costs normally associated with the energy losses created thereby.

Figure 4:
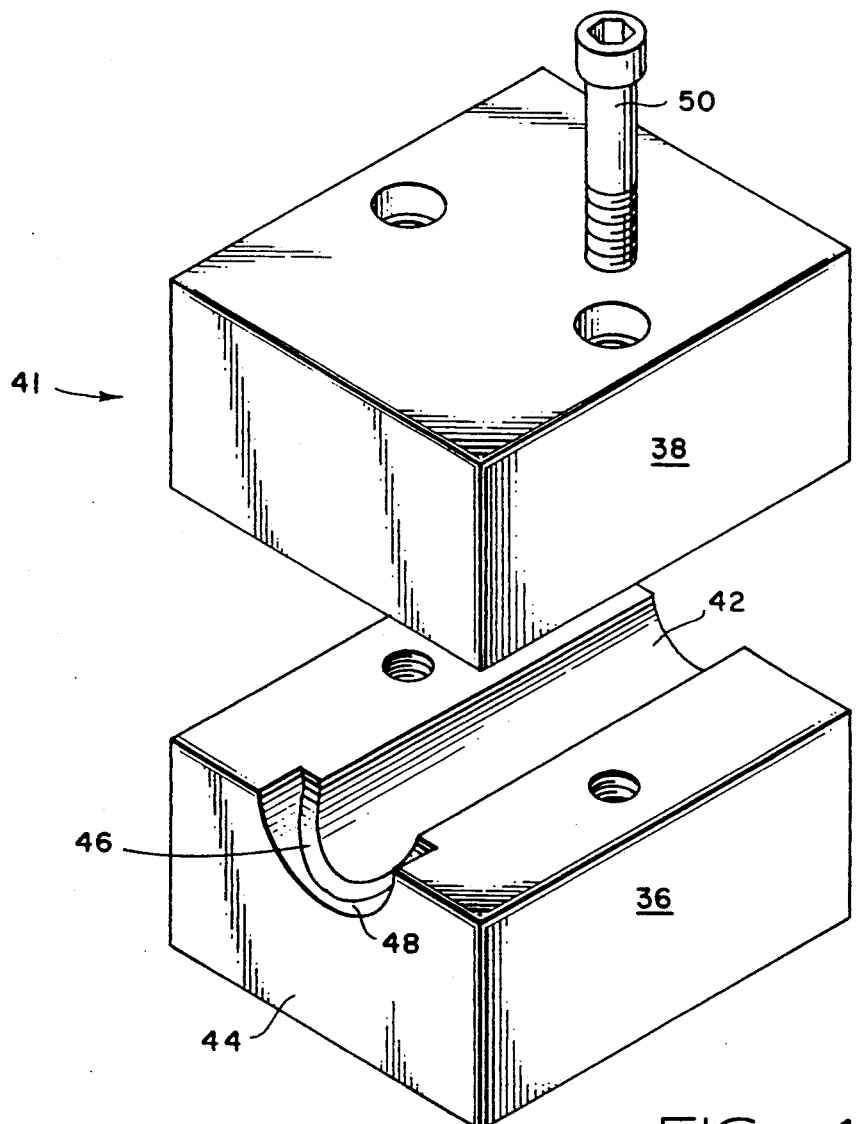
FIG. 4 is an isometric exploded view of a die utilized for supporting the tube end during shaping in accordance with the invention.
Figure 5:
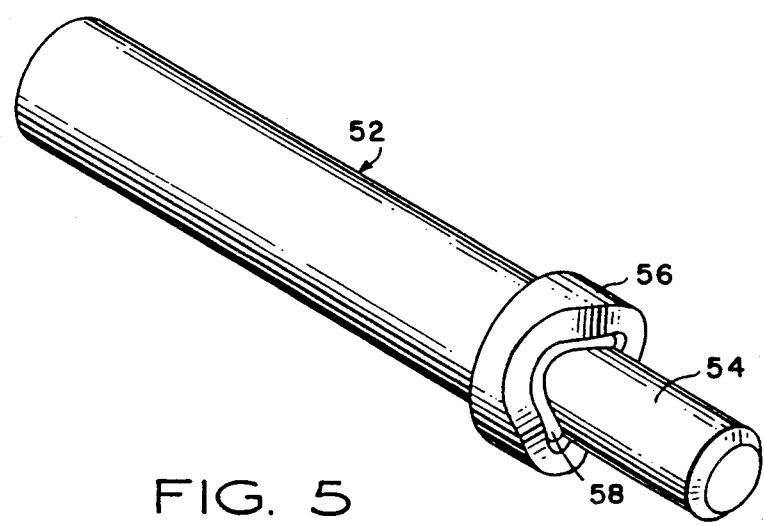
FIG. 5 is an isometric view of the mandrel and punch utilized in cooperation with the die of FIG. 4 for shaping the tube end.

Fabrication of the pilot end of the secondary tube 16 is effected in a manner as will now be described with respect to FIGS. 4–7. As illustrated in FIG. 4, two cooperating halves 38 and 40 of a stationary die 41 each include complementary longitudinal tube support bores 42 that terminate inward of die end 44 at an end face 46 defining the contour of upper bead face 35. Between faces 46 and 44 is a length of die section 48 in which a cooperating swaging die 56 is to be received.

Figure 6A:
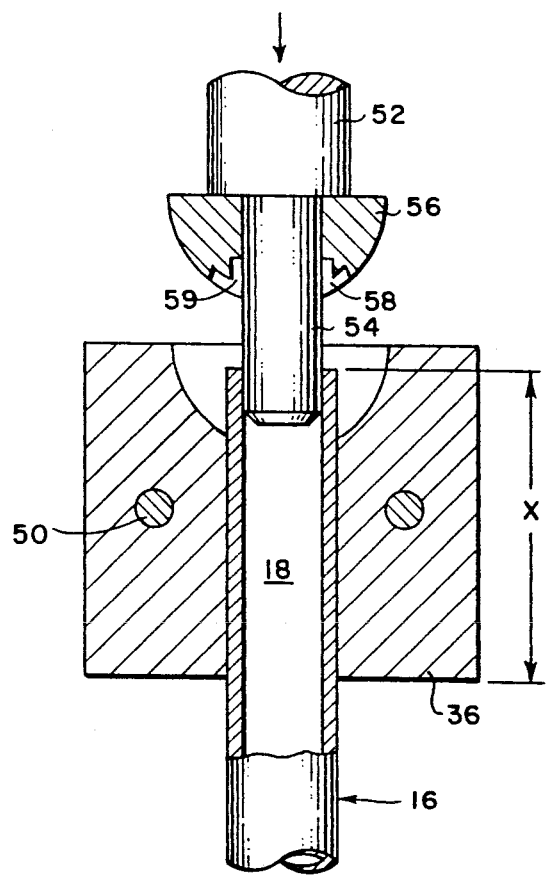
FIGS. 6A and 6B sequentially illustrate the steps of shaping the tube end with the mandrel of FIG. 5.

For swaging the tube end, a selected length of tubing "X" as can best be seen in FIG. 6A is first placed in the bore portions 42 of the die halves 38 and 40. Once positioned, the complementary halves are secured together by means of bolts 50 for clamping the tube end portion "X" therebetween. While the tube end portion "X" is secured, a cylindrical punch 52 including an elongated end mandrel 54 containing swaging die 56 is coaxially extended inward of the tube end in the manner illustrated in FIG. 6A. The swaging die 56 as seen in FIG. 6 includes in the area immediately surrounding mandrel 54 recessed surface cutouts 58 and 59 contoured to effect the shaping to be formed.

Figure 6B:
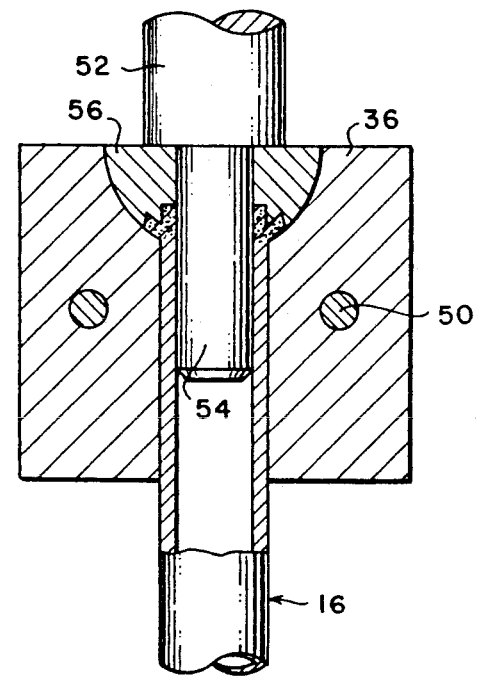
Figure 7:
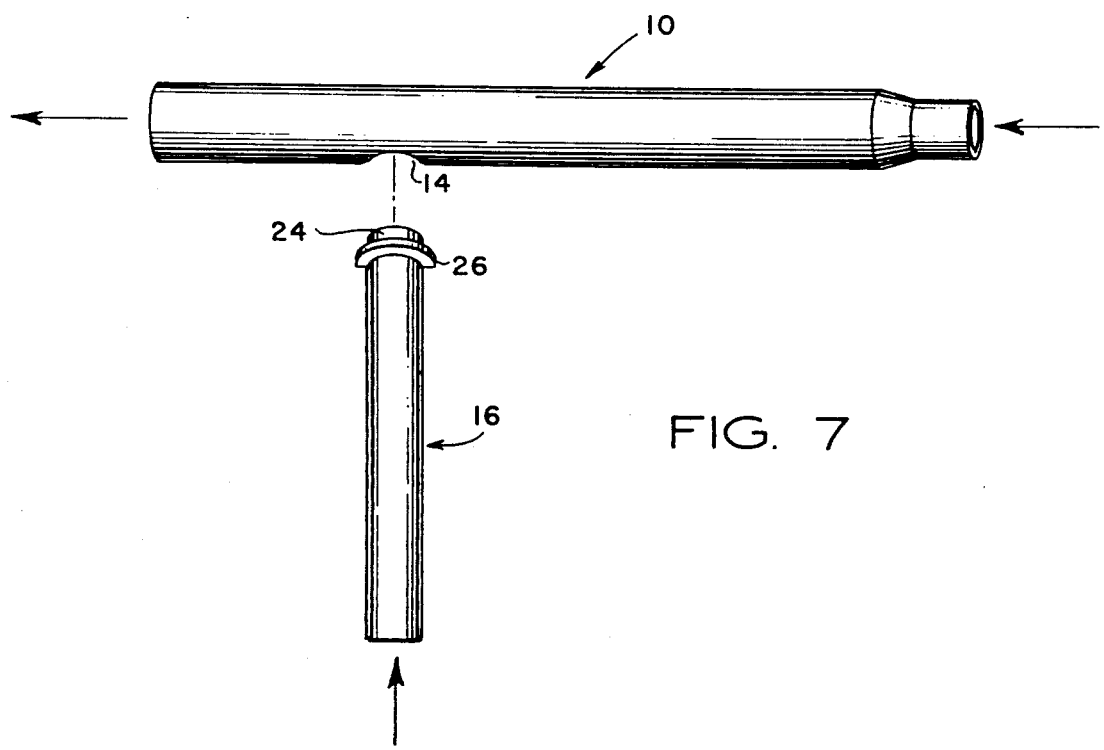
FIG. 7 is an exploded side view of the preliminary placement arrangements of the respective tubing sections hereof prior to their being bonded into a joint formation.

When forced against the tube end in the manner of FIG. 6B, the cutouts will swage the end so as to effect the conforming contour of recess 36 and upset integral saddle bead 26. On removing the deformed tube 16, the resulting tube end is instantly usable for effecting a joint in accordance herewith whereby the saddle face 34 when assembled cooperates with the outside diameter of the primary conduit 10 for quickly and easily effecting a contour overfit of tube 10. The intersection of the axes of the respective conduits even during initial unbonded assembly will be substantially if not accurately perpendicular in every instance.

Moreover, for so long as the components are even loosely assembled, their lateral relation will be maintained in the subsequent bonding step that follows. Once swaged in the manner of FIGS. 6A and 6B, the pilot end of secondary conduit 16 can be readily inserted into the aperture 14 of primary conduit 10 in the arrangement of FIG. 7 to bond the respective tube sections and effect the permanent joint formation hereof.

By the above description, there is disclosed an improved construction of a joint formed between intersecting tubing sections along with an improved method of effecting the product as will readily enable the formation of such joints. The fabrication of the tube end for producing the latter is relatively simple in requiring the use of modest tooling structures to upset the clamped tube end for forming an integral saddle bead and conforming end face.

Not only does such structure provide enhanced reliability in perfecting the intended alignment between the respective tube sections but it also provides quality assurance that results in labor savings compared to the labor times previously required. Moreover, the additional surface area provided by the inside face of the saddle bead against the exterior periphery of the primary conduit as compared to the flanged bead of the prior art strengthens the bonded joint to a considerably greater extent than heretofore achieved by virtue of the increased area of surface contact. The recess 36 formed in the swaging operation by virtue of the obstruction that it eliminates will enable considerable savings of equipment size and/or operating requirements for the systems in which such tube joints are to be utilized. The advantages and versatility afforded thereby therefore represents a significant advance in the art of joint formations.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. In the method of joining primary and secondary sections of metal tubing in an intersecting union, the improvement comprising the steps:

forming an aperture through the sidewall of the primary tubing section at a location at which the union is to be produced;

swaging an end portion of said secondary tubing section to produce a saddle bead and pilot end portion;

forming an annular face on the saddle bead and contouring said annular face for conformed surface engagement with the outside diameter surface of the primary tubing section;

forming an annular end face on the tubular pilot portion and contouring said pilot portion annular end face substantially in concentric relation with said contoured saddle bead annular face;

inserting the pilot end portion of the secondary tubing section into said primary tubing aperture with the contoured annular face of said saddle bead engaging the outside diameter surface of said primary tubing section; and, producing a metal bond beween the contoured saddle bead and the external sidewall surface of the primary tubing section.

* * * * *